Figure 1:
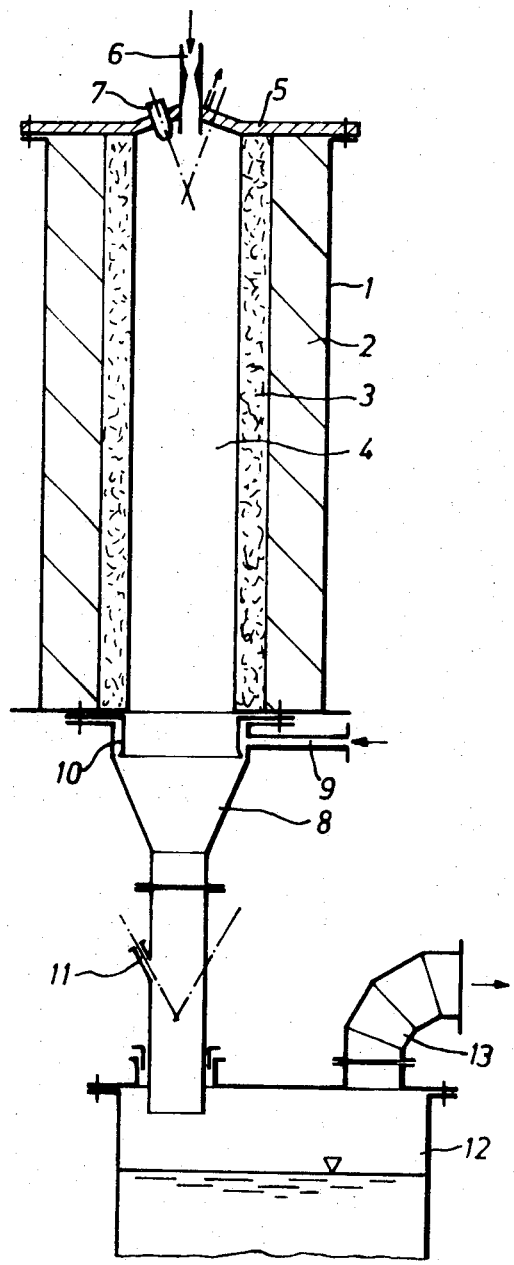

United States Patent
Hahnkamm et al.

[11] 3,723,611
[45] Mar. 27, 1973

[54] PRODUCTION OF CHROMIUM (III) OXIDE OF LOW SULFUR CONTENT

[75] Inventors: Volker Hahnkamm; German Broja; Karl Brändle; Claus-Heinrich Elstermann, all of Krefeld, Germany

[73] Assignee: Bayer Aktiengesellschaft, Leverkusen, Germany

[22] Filed: June 14, 1971

[21] Appl. No.: 152,768

[30] Foreign Application Priority Data

June 20, 1970 Germany...................P 20 30 510.6

[52] U.S. Cl......................................423/607, 23/284
[51] Int. Cl...........................C01g 37/02, B01j 1/00
[58] Field of Search.......................23/145; 423/607

[56] References Cited

UNITED STATES PATENTS 2,544,687  3/1951  Kalbach................................23/145

FOREIGN PATENTS OR APPLICATIONS 15,473  9/1894  Great Britain......................23/145
20,681  7/1899  Great Britain......................23/145

Primary Examiner—Earl C. Thomas
Assistant Examiner—Hoke S. Miller
Attorney—Ralph D. Dinklage et al.

[57] ABSTRACT

Chromium (III) oxide is prepared by contacting a finely divided alkali metal chromate with hydrogen at a temperature of about 900° to 1,600° C. The reaction product is cooled with liquid to produce a dispersion of $Cr_2O_3$ in water. If the dispersion is kept alkaline the $Cr_2O_3$ when separated contains less than 0.005 percent of sulfur. The initial chromate should be finely divided, e.g., less than 500μ or dissolved, and an acid-forming gas such as chlorine or hydrogen chloride can also be included to form a salt with the by-product alkali metal oxide.

11 Claims, 2 Drawing Figures

INVENTORS:
VOLKER HAHNKAMM, GERMAN BROJA, KARL BRÄNDLE, CLAUS HEINRICH ELSTERMANN.

INVENTORS:
VOLKER HAHNKAMM, GERMAN BROJA, KARL BRANDLE, CLAUS HEINRICH ELSTERMANN.

PRODUCTION OF CHROMIUM (III) OXIDE OF LOW SULFUR CONTENT

It is accordingly an object of the invention to provide a simple process involving readily available starting materials and a simple apparatus to produce chromium(III) oxide of markedly low sulfur content.

The present invention relates to a continuous process for the production of very pure chromium(III) oxide which has a low sulfur content and which is suitable for use as pigment by the reduction of an alkali metal chromate with hydrogen at an elevated temperature, and to an apparatus suitable for carrying out the process.

Numerous processes are already known by which chromium-(III) oxide can be produced from hexavalent chromium compounds at elevated temperatures. Chromic acid, ammonium chromates or alkali metal chromates may be used as the starting compounds. The reaction may be carried out without the addition of a reducing agent (e.g., as in the case of the thermal decomposition of chromic acid or ammonium chromate) or with the addition of a reducing agent. Reducing agents used for this purpose are the conventional organic or inorganic reducing agents such as sawdust, molasses, cellulose waste liquors, acetylene, methane, sulfur compounds, phosphorus, carbon and hydrogen. However, only processes which use alkali metal chromates as the starting compounds have achieved commercial importance since other chromates or chromic acid must first be prepared from alkali metal chromates.

Sodium chromate can be reduced to chromium(III) oxide e.g., with generator gas at a temperature above 660° C. In this process, generator gas which has been preheated to a temperature of 700° to 800° C. is reacted with hot sodium chromate solution in a spray tower. The reaction product is washed out and then annealed for some time at 800° C. (I.G. Ryss, R. Mandel, Novosti Tekhniki, 1938, No. 21, 37–38).

In another process, chromium(III) oxide is obtained by passing hydrogen at 300° to 350° C. over a dry sodium chromate granulate (see British Patent Specification No. 748 610). Chromium(III) oxide may also be obtained by heating a mixture of sodium chromate or sodium dichromate with aluminum oxide or aluminum phosphate in the presence of hydrogen, carbon monoxide or hydrocarbons at temperatures of 1,000° to 1,200° F. (538° to 649° C.) (US Patent Specification No. 2,921,838).

The processes previously described have the disadvantage of being discontinuous and hence providing low volume/time yields.

According to British Patent Specification No. 1,038,773, chromium(III) oxide can be obtained in a single process step from chromium compounds which can thermally be decomposed (chromic acid or ammonium dichromate). For this process, an aqueous solution of the chromium compound is either mixed with a liquid fuel, injected into a tubular reactor and decomposed by heat in the flame produced by the addition of air or it is sprayed into a stream of hot combustion gases and thermally decomposed. The reaction is carried out at temperatures of 800° to 1,000° C. $Cr_2O_3$ is precipitated with water below the reactor and isolated by filtration. The disadvantage of this process is that only hexavalent chromium compounds which can thermally be decomposed, such as ammonium chromates or chromic acid, can be used.

These and other objects and advantages are realized in accordance with the present invention pursuant to which there is provided a process for the continuous production of chromium(III) oxide which has a low sulfur content by the reduction of an alkali metal chromate with hydrogen. In the process a finely divided alkali metal chromate is reduced at a temperature of from about 900° to 1,600° C. in a heated reaction zone which contains hydrogen, the reduction being optionally carried out in the presence of a gas which reacts with the alkali metal oxide formed by reduction of the alkali metal chromate to form a salt, and the chromium(III) oxide formed is recovered in the form of a dispersion which has been rendered alkaline.

It was surprisingly found that high yields of a very pure chromium(III) oxide can be obtained from a readily available alkali metal chromate if the reaction is carried out at a temperature of from about 900° to 1,600° C., preferably from about 1,000° to 1,400° C., and the alkali metal chromate is used in such a fine state of subdivision that the proportion of particles having a particle size of over about 500μ, preferably over about 200μ, is as small as possible. Furthermore, it was found that the sulfur content of substantially 0.1 percent in the starting material can be reduced to below about 0.005 percent in the resulting chromium(III) oxide if the product is recovered from the waste gas by means of a dispersion which has been rendered alkaline.

It has been found very advantageous to carry out the reduction in the presence of a gas which reacts with the alkali metal oxide formed on reduction of the alkali metal chromate to form a salt. The yield obtained by this process, based on the quantity of the alkali metal chromate used, can in this way be substantially increased (from a yield of about 90 percent obtained without the addition of a suitable gas to a yield of over 95 percent); moreover, the advantage of the low sulfur content in the chromium(III) oxide produced is maintained. The $Cr_2O_3$ content of the resulting product is over 99 percent and the loss on annealing is less than 1 percent.

The reduction theoretically proceeds according to the following equation:

which may entail the following intermediate reactions:

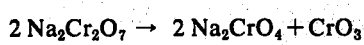

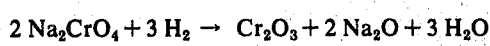

According to a preferred embodiment, the process may be carried out as follows: The alkali metal chromate is delivered pneumatically into the reactor with the aid of a gas or in the form of a solution. The reaction zone of the reactor is heated directly, the temperature being regulated by the quantity of heating gases supplied.

The alkali metal chromate used may be either a monochromate or a condensed polychromate. It is advantageous to use e.g., $Na_2Cr_2O_7$, $Na_2Cr_2O_7 \cdot 2 H_2O$, $Na_2CrO_4$, $K_2Cr_2O_7$ or $K_2CrO_4$. The particle size of the starting materials should be in the range of from about $10\mu$ to $500\mu$.

Pneumatic delivery of the starting material into the reactor is advantageously effected by means of an auxiliary gas such as nitrogen although the hydrogen required for the reduction may also be used for this purpose. Moreover, fine subdivision and uniform distribution of the alkali metal chromate over the cross-section of the reactor may be achieved, not by introducing pneumatically an alkali metal chromate which is at a certain fine degree of subdivision, but by starting with an aqueous solution of the corresponding alkali metal chromate and then subdividing this by injecting it through nozzles with the aid of a gas so that the droplet size is less than about $100\mu$ and advantageously in the range of from about 10 to $30\mu$.

Heating is by combustion of hydrogen with gases which contain oxygen, the temperature being adjusted by altering the rate of gas supply. The quantity of hydrogen supplied, however, must be at least the stoichiometric quantity required for reduction in addition to an excess of about 10 to 30 percent. Heating of the reactor may also be effected by means of hot waste gases obtained from a combustion process outside the reactor. These waste gases which may be obtained from the combustion of natural gas with air, for example, are then introduced into the reactor. The excess of air required for complete combustion of the combustible gas outside the reactor is then burned with hydrogen in the reactor itself.

The reactor is so designed that there is room for a dwelling zone below the reaction zone, in which any CrO(OH) formed may continue to react until it is converted to $Cr_2O_3$ and the particle size increases to about 0.1 to $10\mu$, preferably about 0.2 to $4\mu$. The velocity of the gas in the reactor is advantageously so adjusted that the time of stay of the particles is between about 0.1 and 10 seconds and advantageously about 0.5 to 4 seconds.

The $Cr_2O_3$ formed can then be removed in any desired manner, e.g., in cyclones or rotary filters. Below the reactor there is advantageously an apparatus which serves to separate most of the resulting $Cr_2O_3$ as a wet product from the stream of waste gas and at the same time to adjust the temperature of the waste gas to below 100° C. The separating or cooling liquid used may be the initially formed dispersion of $Cr_2O_3$ in water. This dispersion is continuously circulated by pumping it through a cooler and returned to the separating and cooling part. It has been found especially advantageous to produce a film of liquid by injecting liquid or dispersion against the wall of the cooling apparatus. When the $Cr_2O_3$ gas mixture is saturated with steam, liquid or dispersion may be injected through nozzles, the temperature of the mixture of gas and solids being reduced to below 100° C. and most of the solid in the aqueous dispersion being separated. It is especially advantageous to use the alkali metal oxide formed in the reaction for adjusting the separating liquid or dispersion to a pH of above 7.

The residue of $Cr_2O_3$ remaining in the waste gas is separated in a following wash tower. The concentrated dispersion is continuously pumped off to recover chromium oxide and is replaced by the appropriate quantity of fresh water.

According to a particularly advantageous embodiment of the process of the invention, a gas which forms an acid when dissolved in water is first introduced into the reactor. In this way, the alkali metal oxide produced in the reaction can be bound by salt formation. The quantity of the additional gas must be so calculated that the pH of the $Cr_2O_3$ dispersion will be in the range from about 7 to 12 and preferably from about 8 to 10 since it is only when an alkaline dispersion is used that the sulfur content of chromium(III) oxide can be reduced to below about 0.005 percent. The following gases, for example, may be used as salt forming agents: Chlorine, hydrogen chloride, bromine, hydrogen bromide, nitrogen monoxide, nitrogen dioxide or $CO_2$.

The salt-forming gases may be supplied to the reactor by any method. They may first be mixed with the air of combustion and/or with the oxygen of combustion and/or with hydrogen and/or with the gas required for pneumatically delivering the alkali metal chromate, but the gaseous salt-forming agent may also be introduced into the reactor through nozzles especially provided for the purpose, which may be fitted either at the top end of the reactor or underneath the reaction zone. In order to keep the dispersion at an alkaline pH, the salt-forming agent is added in a quantity which is less than the stoichiometrically equivalent quantity by an amount calculated to correspond to the required pH.

Figure 2:
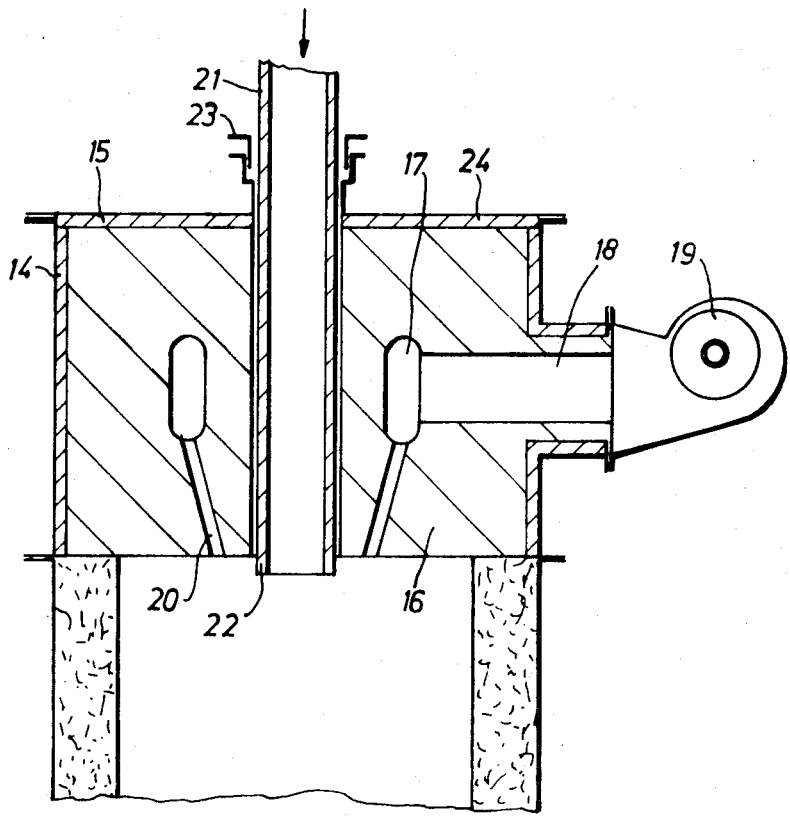

The invention will be further described with reference to the accompanying drawings, wherein FIG. 1 is a schematic vertical section through an apparatus for carrying out the process, and FIG. 2 is a vertical section through the top of another embodiment of apparatus for carrying out the process.

Referring now more particularly to the drawings, in FIG. 1 the reference numeral 1 denotes a steel cylinder, 2 denotes a layer of insulation, 3 a heat resistant, ceramic lining, 4 a reactor chamber, 5 a cover with cooling device, 6 a feed tube and 7 a burner nozzle. The reference numeral 8 denotes a conically tapered tube, 9 denotes tubes welded thereto, 10 a metallic shield plate, 11 nozzles, 12 a container and 13 a pipe connection. In FIG. 2, the reference numeral 14 denotes a steel cylinder, 15 an asbestos layer, 16 a ceramic mass, 17 a ring channel, 18 a pipe connection, 19 a burner, 20 nozzles, 21 an opening in the steel cylinder, 22 an inlet tube, 23 a packing gland and 24 a cover.

The reaction takes place in a reaction chamber 4 which consists of a steel cylinder 1 which has on its interior a layer 2 of insulating material and a heat resistant ceramic lining 3. The reactor is closed at the top by a cover 5 which is preferably made of high grade steel and equipped with water cooling (not shown). The tube 6 for supplying the alkali metal chromate extends centrally through the cover. Individual burners 7 are set at an angle to the vertical symmetrically about feed tube 6. Below the reactor is the separating and cooling section 8 which is conical and tapers from above downwards. Liquid or dispersion is pumped through tangentially placed tubes 9. A cylindrical shield plate 10 prevents sprayed liquid from hitting the ceramic wall of the reactor. Separate nozzles 11 through which liquid or dispersion can be sprayed are arranged all around the circumference in the lower cylindrical part. Waste gas and liquid or dispersion then enter the container 12 from where the waste gas is carried to the wash tower through the connection 13.

Most of the energy required for reduction may also be produced by introducing the hot waste gas of a flame burned outside the reactor into the reactor from above, e.g., the flame produced by the combustion of natural gas and air. Only a small flame then burns in the reactor itself, by means of which the excess of air required for complete combustion outside the reactor is used up with hydrogen. FIG. 2 shows the top of the reactor required for this method. In this case, the whole arrangement for heating with hot, burned waste gases is attached to the reactor by flanges. Specifically, the apparatus consists of a steel cylinder 14 which has a layer of asbestos 15 on the inside. The remainder is substantially filled with a ceramic rammer mass or brickwork 16. An annular channel 17 is left free. The hot waste gas is conducted tangentially into this channel from a burner 19 by way of insulated pipe connection 18. The heating gas flows from the annular channel 17 into the reactor through numerous nozzles 20 which are arranged concentrically around the central axis. In addition, a central cylindrical opening 21 has been left free in the ceramic core. The product feed pipe which is cooled with water extends through this opening into the reactor. Gas-tight sealing is provided by a packing gland 23 which is welded to the cover 24.

The products obtained in this way are very pure and are suitable for use as pigments. The process according to the invention will now be further described with the aid of the following examples.

EXAMPLE 1

A cylindrical steel tube (external diameter = 150 mm, height = 1,100 mm) was used as the reactor. On the inside it has an insulation of a ceramic rammer mass ($Al_2O_3$) (internal diameter = 80 mm). The burner consisted of three coaxial quartz tubes. Through the inner tube, $Na_2Cr_2O_7 \cdot 2 H_2O$ (500 g/h) was uniformly distributed over cross-section by means of the hydrogen required for the reduction and additional nitrogen. Hydrogen for combustion (4 m³/h) was passed through the middle tube and oxygen (2 m³/h) through the outer tube. A temperature of 1,400° C was obtained in the reaction zone with the given quantities of gas. The burner was attached to the reaction tube with a water cooled packing gland of VA steel. A quartz tube which had eight tube connections arranged round its circumference at its middle was attached to the lower end of the reaction tube. An aqueous suspension which had previously been cooled in a cooling coil which maintained the temperature of the suspension at about 50° C. was injected through these tube connections for the purpose of separating the $Cr_2O_3$ formed and chilling the hot reaction gases. The suspension and waste gas then flowed through a high grade steel funnel into the washing part which was made of glass (diameter 100 mm). The suspension, which was concentrated in the course of the experiment, could run off into the receiver through a lower tube connection. The waste gases were passed through a layer of filling bodies made of glass onto which the suspension was injected from above, and they were then drawn off through a flue.

The experiment was stopped after 5 hours. 1,105 g of $Cr_2O_3$ ($Cr_2O_3$ content 98.5 percent) could be recovered from the suspension. The conversion based on the quantity of sodium dichromate supplied was calculated by determining the quantity of sodium dichromate in the filtrate of the suspension which was at a pH of 14, and this conversion was found to be 89.7 percent. The sulfur content was less than 0.005 percent.

There was no deposit on the wall of the reactor except for a thin, loose layer.

EXAMPLE 2

The reactor used was a steel tube (external diameter = 800 mm, length = 2,500 mm) with a ceramic lining (internal diameter = 360 mm). A hot waste gas obtained in a burner by burning natural gas with air (using a 10 percent excess of air, based on the stoichiometric quantities of the combustion reaction, to prevent the formation of soot) was passed into the reactor from the top through a coaxial annular channel made of ceramic material, and the temperature in the reaction zone was adjusted to 1,300° C. An aqueous solution of $Na_2Cr_2O_7 \cdot 2 H_2O$ (14.5 l/h at a concentration of 1,400 g/l) was distributed in a very fine form (droplet size 10 to 30$\mu$) over the cross-section of the reactor through a two-material nozzle at the top of the reactor (opening angle of the spray cone 25°) by means of the hydrogen required for combustion of the excess air and for the reduction and an additional quantity of nitrogen.

The $Cr_2O_3$ formed was separated from the waste gas in the separating and cooling part below the reactor. This part was conical and tapered from a diameter of 500 mm at the top to a diameter of 200 mm at the bottom. This separation was effected by covering the wall with a film of liquid by tangentially injecting suspension in the upper part. In the middle part there were four radially arranged nozzles through which the cross-section for the passage of waste gas was also covered with suspension. The residue of $Cr_2O_3$ remaining in the waste gas was separated in a following wash tower made of glass (diameter 400 mm) which contained ceramic filling bodies arranged in layers, the lower layer being sprayed with suspension and the upper layer with fresh water. The circulated suspension was cooled with a tubular cooler and kept at 45° C.

The experiment was terminated after 10 hours. 91 kg of $Cr_2O_3$ ($Cr_2O_3$ content 98.9 percent) were obtained from the suspension, which was at pH 14, after filtration, washing and drying (5 hours at 250° C.). The sulfur content was below 0.005 percent 89.9 percent of the sodium dichromate supplied was reduced to $Cr_2O_3$.

EXAMPLE 3

The experiment described in Example 1 was repeated with the one difference that during the experiment the suspension was adjusted to pH 2 by dropwise addition of dilute hydrochloric acid.

The experiment was again stopped after 5 hours. 1,120 g of $Cr_2O_3$ ($Cr_2O_3$ content 98.6 percent) could be obtained from the suspension. The conversion, based on the amount of sodium dichromate used, was found to be 90.1 percent. Determination of the sulfur content: 0.043 % S.

EXAMPLE 4

The arrangement and conditions of the experiment were the same as in Example 1. In addition, a quantity of HCl gas was added to the oxygen of combustion so that the pH of the suspension was 8.5 (approximately 50 l/h). The quantity of HCl was controlled by potentiometric pH determination.

1,180 g of $Cr_2O_3$ ($Cr_2O_3$ content 99.3 percent) could be obtained from the suspension after 5 hours. The yield, based on the quantity of $Na_2Cr_2O_7 \cdot 2 H_2O$ supplied and determined by the sodium dichromate content of the filtrate, was 95.6 percent. The loss on annealing was 0.6 percent and the sulfur content less than 0.005 percent.

EXAMPLE 5

The apparatus and experimental conditions were the same as in Example 1. In addition, chlorine was introduced into the reaction chamber through four nozzles extending through the water cooled glands, the amount of chlorine introduced being such that the suspension obtained on deposition of the $Cr_2O_3$ and cooling of the waste gases had a pH of 9.5 (approximately 23 l/h). After 5 hours, 1,175 g of $Cr_2O_3$ ($Cr_2O_3$ content 99.5 percent) were obtained. The yield, based on the $Na_2Cr_2O_7 \cdot 2 H_2O$ supplied, was 95.3 percent. The loss on annealing was 0.5 percent and the sulfur content was below 0.005 percent.

EXAMPLE 6

The apparatus and experimental conditions were as in Example 1. In addition, HCl gas was introduced into the reactor through four nozzles arranged below the reaction zone, approximately in the middle of the reactor, the quantity of HCl introduced being such that the suspension which was formed had a pH of 9 (approximately 48 l/h).

After 5 hours, 1,180 g of $Cr_2O_3$ ($Cr_2O_3$ content 99.3 percent) were obtained. The yield, based on the $Na_2Cr_2O_7 \cdot 2 H_2O$ supplied, was 95.3 percent. The loss on annealing was found to be 0.7 percent and the sulfur content less than 0.005 percent.

It will be appreciated that the instant specification and examples are set forth by way of illustration and not limitation and that various modifications and changes may be made without departing from the spirit and scope of the present invention.

What is claimed is:

1. A process for the production of chromium (III) oxide which comprises contacting a finely divided alkali metal chromate, wherein the particle size of the alkali metal chromate is less than about 500 $\mu$, with hydrogen at a temperature of about 900° to 1,600° C for about 0.1 to 10 seconds.

2. The process according to claim 1 including contacting the reaction product with sufficient cool liquid to reduce the temperature of the waste gases below about 100° C. and to produce a dispersion of $Cr_2O_3$ in said liquid.

3. The process according to claim 2, wherein at least a part of said dispersion is recycled to cool the reaction product.

4. The process according to claim 2, wherein said liquid dispersion has a pH of about 7 to 12, the process including the further step of thereafter separating $Cr_2O_3$ from said liquid, said $Cr_2O_3$ having a sulfur content of less than about 0.005 percent.

5. The process according to claim 1, wherein the contacting is carried out in the presence of a gas which reacts to form a salt with the by-product alkali metal oxide formed upon reduction of the chromate.

6. The process according to claim 5, wherein said gas is a halogen or hydrogen halide.

7. The process according to claim 1, wherein the alkali metal chromate is introduced in the form of an aqueous solution.

8. The process according to claim 7, wherein the aqueous solution comprises about 50 to 90 percent by weight of $Na_2Cr_2O_7$.

9. The process according to claim 1, wherein the reaction temperature is maintained by the combustion of hydrogen supplied in excess of the quantity required for reduction.

10. The process according to claim 1, wherein the temperature during contact is maintained by supplying to the contact zone hot gaseous reaction product of a combustion effected outside the reaction zone.

11. The process according to claim 4, wherein the alkali metal chromate is $Na_2Cr_2O_7$ and has a particle size less than about 500$\mu$, the reaction being carried out in the presence of chlorine or hydrogen chloride which reacts with by-product sodium oxide to form sodium chloride, the temperature during contact being maintained by the combustion of hydrogen supplied in excess of the quantity required for reduction.

* * * * *